Patented Sept. 12, 1933

1,926,766

UNITED STATES PATENT OFFICE 1,926,766

RUST PROOFING COMPOSITION AND METHOD OF PRODUCING THE SAME

Leonard H. Englund, Winona, Minn., assignor to Victor Chemical Works, a corporation of Illinois No Drawing. Application October 15, 1931
Serial No. 569,121

15 Claims. (Cl. 91—70)

My invention relates to a rust proofing composition and more particularly to a method of treating the surfaces of ferrous-base material, such as iron and steel articles to prevent rust or corrosion and to impart to such surfaces the property of effectively resisting the action of rust promoting agents.

In accordance with the present invention, I apply to the ferrous metal surface to be protected, ammonium sulphocyanate incorporated in a coating vehicle, for example such as is commonly employed in paints and varnishes. It may be conveniently added to the priming paint or lacquer coat, as ordinarily applied to such metals or may be applied as a separate initial coating in a similar vehicle, for example, one having a drying oil base, such as linseed oil, China wood oil, Perilla oil, or the like, or a volatile solvent base, such as amyl, ethyl or butyl acetate, a mixture of acetone and alcohol, or the like. The effectiveness of the rust-inhibiting action may be improved by heating or baking the initial or rustproofing coating as hereinafter more fully set forth.

In practicing my invention, I prepare a solution or suspension of the rust-proofing composition by dissolving or suspending in a drying oil vehicle such as linseed oil or Perilla oil, or an organic solvent, from 0.25 to 17.5 grams per liter of solvent or vehicle of ammonium sulphocyanate.

The coating composition containing ammonium sulphocyanate, prepared as described above, may be applied to the surfaces of iron or steel articles by any suitable method, such as by brushing, spraying, or immersing the article to be protected in the composition and may be dried in air, or if desired, the coated article may be placed in a suitable oven and baked at an elevated temperature of say, about 200° F. for about 30 minutes to dehydrate the coating composition and eliminate volatile constituents thereof. If desired, a suitable paint or lacquer may then be applied to the treated metallic surface.

The ammonium sulphocyanate may also be admixed with the priming coat of paint or lacquer which is to be applied to a metallic surface. For this purpose, the ammonium sulphocyanate is dissolved in a suitable organic solvent, such as denatured ethyl, or methyl alcohol, which may be rendered miscible and compatible with the paint or lacquer by blending with a larger volume of gasoline or naphtha, employing a suitable blending agent, such as butyl, isobutyl, propyl, or isopropyl alcohol.

The following specific example will serve to illustrate and explain my invention. 7 grams of ammonium sulfocyanate are dissolved in 75 cubic centimeters of methanol, and 200 cubic centimeters of gasoline are added to this solution and thoroly mixed therewith while utilizing about 125 cubic centimeters of butyl alcohol as a blending agent. This solution is then mixed with a suitable priming paint in the proportion of about 3 to 7% by volume, but preferably in the proportion of 5% by volume. After this mixture has been applied to iron or steel articles, by any appropriate method, they are gradually heated in an oven or kiln to a temperature of about 200° F. for about 30 minutes thereby eliminating ammonia and other volatile solvents. Thus prepared, the metallic surfaces may be subjected to any desired finishing operation.

If desired, my improved coating composition containing ammonium sulphocyanate may be applied in aqueous solution to the metallic surfaces to be protected, and the water eliminated by a subsequent drying operation. Any desired type of coating material may then be applied to the metallic surface protected as described above.

My improved composition and process for producing iron salts on the surfaces of iron and steel articles furnishes a very high degree of resistance to rusting and corrosion under conditions of practical use. Furthermore, my improved composition may be satisfactorily incorporated in paints or lacquers which are subsequently utilized as the priming coats on iron and steel articles.

While I have described my invention in considerable detail and have given specific examples, it will be understood that such examples shall be construed as illustrative and not by way of limitation. Other modifications of my invention will be apparent to those skilled in the art without departing from the spirit and scope thereof. It is, therefore, desired that only such limitations shall be imposed as are indicated in the appended claims.

I claim:

1. A rust-preventing composition for ferrous-base material comprising ammonium sulphocyanate.

2. A rust-preventing composition for ferrous-base material comprising an organic coating composition containing ammonium sulphocyanate.

3. A rust-preventing composition for ferrous-base material comprising an organic solution containing from 0.25 grams to 17.5 grams of ammonium sulphocyanate per liter of solution.

4. A rust-preventing composition for metal articles comprising a drying oil vehicle and ammonium sulphocyanate.

5. A rust-preventing composition for application to iron or steel articles, comprising ammonium sulphocyanate, an organic solvent therefor, gasoline, and a blending agent.

6. A rust-preventing composition for application to iron or steel articles, comprising ammonium sulphocyanate, a drying oil vehicle therefor, naphtha, and a blending agent.

7. A rust-preventing composition for application to iron or steel articles, comprising about 7 grams of ammonium sulphocyanate, about 75 cubic centimeters of methanol, approximately 200 cubic centimeters of gasoline and about 125 cubic centimeters of butyl alcohol.

8. A rust-preventing composition for ferrous-base material comprising an aqueous solution containing ammonium sulphocyanate.

9. A rust-preventing composition for ferrous-base material comprising ammonium sulphocyanate and a volatile base solvent therefor.

10. A rust-preventing composition for ferrous-base material comprising about 7 grams of ammonium sulphocyanate, about 75 cubic centimeters of a drying oil vehicle, approximately 200 cubic centimeters of gasoline and a blending agent.

11. The method of rust-proofing the surfaces of ferrous-base material which comprises applying a solution containing ammonium sulphocyanate to said surfaces and then heating said material below a decomposing temperature to eliminate volatile constituents.

12. The method of rust-proofing the surfaces of ferrous-base material which comprises applying a solution containing ammonium sulphocyanate to said surfaces.

13. The method of rust-proofing ferrous-base material which comprises applying a solution containing ammonium sulphocyanate to said material and then heating said material below a decomposing temperature for a sufficient length of time at an elevated temperature to eliminate volatile constituents.

14. The method of rust-proofing the surfaces of ferrous-base material, which comprises applying a solution consisting of ammonium sulphocyanate, an organic solvent therefor, gasoline, a blending agent, and a priming paint to said surfaces and then heating said material at a temperature of about 200° F. for a sufficient length of time to eliminate substantially all volatile constituents from said surfaces.

15. In the method of rust-proofing ferrous-base material, the steps which comprise applying a solution containing ammonium sulphocyanate to said material, and then heating it below a decomposing temperature for about 30 minutes at a sufficient temperature to eliminate volatile constituents.

LEONARD H. ENGLUND.